## (12) United States Patent
Nakamura et al.

(10) Patent No.: US 8,720,977 B2
(45) Date of Patent: May 13, 2014

(54) DOOR ATTACHED TO CABIN FOR WORK VEHICLE

(75) Inventors: Norimi Nakamura, Sakai (JP); Koji Nada, Sakai (JP); Hiroaki Kitaguchi, Takaishi (JP)

(73) Assignee: Kubota Corporation, Osaka (JP)

( * ) Notice: Subject to any disclaimer, the term of this patent is extended or adjusted under 35 U.S.C. 154(b) by 140 days.

(21) Appl. No.: 13/232,679

(22) Filed: Sep. 14, 2011

(65) Prior Publication Data
US 2012/0248813 A1 Oct. 4, 2012

(30) Foreign Application Priority Data
Mar. 30, 2011 (JP) .................................. 2011-074903

(51) Int. Cl.
*B62D 33/06* (2006.01)
(52) U.S. Cl.
USPC ..................... 296/190.11; 49/502; 296/146.2; 296/146.5
(58) Field of Classification Search
USPC ................. 296/148.154, 146.2, 146.5, 146.9, 296/146.11, 146.16, 190.11; 49/504, 502; 16/82
See application file for complete search history.

(56) References Cited

U.S. PATENT DOCUMENTS

| 2,821,429 | A | * | 1/1958 | Rantala | 296/208 |
| 4,445,721 | A | * | 5/1984 | Yaotani et al. | 296/154 |
| 4,914,863 | A | * | 4/1990 | Laukhuf | 49/502 |
| 4,962,601 | A | * | 10/1990 | Gold | 49/374 |
| 6,189,267 | B1 | * | 2/2001 | Staser | 49/503 |
| 2008/0093882 | A1 | | 4/2008 | Shibata et al. | |
| 2008/0093883 | A1 | | 4/2008 | Shibata et al. | |
| 2011/0062748 | A1 | * | 3/2011 | Kaita et al. | 296/146.9 |
| 2012/0161468 | A1 | * | 6/2012 | Tsumiyama et al. | 296/146.11 |

FOREIGN PATENT DOCUMENTS

JP 2008105601 A 5/2008

* cited by examiner

*Primary Examiner* — Glenn Dayoan
*Assistant Examiner* — Pinel Romain
(74) *Attorney, Agent, or Firm* — The Webb Law Firm

(57) ABSTRACT

In a door (25) of a cabin for work vehicle, which door (25) opens and closes an entrance of the cabin and includes a door main body (25A) having a plurality of accessories (A), the door main body (25A) is formed as a hollow welded unified structure having a door cavity (25B), by welding an inner panel (27) to an outer panel (28) each made of a press-molded sheet-metal. An accessory attaching portion (B) is integrally molded with the inner panel (27), and the outer panel (28) has an opening (28J) formed therein for part assembly which allows the accessories (A) to be brought into the door cavity (25B) and assembled to the accessory attaching portion (B). The outer pane (28) is further provided with a decorative cover (60) for closing the opening (28J).

12 Claims, 11 Drawing Sheets

DOOR ATTACHED TO CABIN FOR WORK VEHICLE

BACKGROUND OF THE INVENTION

1. Field of the Invention

The present invention relates to a door of a cabin for work vehicle, which door opens and closes an entrance of the cabin and includes a door main body having a plurality of accessories assembled thereto.

2. Description of the Related Art

For the door of the cabin for the work vehicle as described above, there can be mentioned a door to which accessories are assembled, including: a door main body formed of a resin plate; a reinforcing frame formed of steel pipe connected in a shape of a loop as an accessory for reinforcing the door main body; and a locking device as an accessory for a closed state of the door, which is attached to the reinforcing frame through a bracket (for example, see Japanese Unexamined Patent Application Publication No. 2008-105601 (paragraphs 0026, 0029, FIGS. 4, 5)).

In the configuration described above, since the door main body is formed of a resin plate, it is necessary to assemble a reinforcing frame in order to secure strength as door, and further, in order to assemble the accessories (e.g. locking device), parts specialized for assembling accessories (e.g. bracket) become necessary. Accordingly, the number of parts as well as the number of assembly steps becomes larger, and thus there has been a room for improvement in facilitating parts control and assembly workability. Especially, with respect to the accessory which is not desired to be exposed, such as locking device, it is necessary to provide a special cover for that accessory, and thus, the number of parts as well as the number of assembly steps becomes yet larger.

SUMMARY OF THE INVENTION

Therefore, it is desirable to provide a door whose production or parts control is facilitated, while strength as door is still secured.

In one aspect of the present invention, there is provided a door attached to a cabin for work vehicle including: an outer panel which forms at least a portion of an exterior surface of the door and has an accessory access opening; an inner panel welded to the outer panel to form a unified structure, with a door cavity formed between the outer panel and the inner panel; an accessory attaching portion for a door accessory formed in the inner panel, wherein access and assembly of the door accessory to the accessory attaching portion are performed through the accessory access opening; and a decorative cover for closing the accessory access opening.

The inner panel and the outer panel forming a door main body can be made of a press-molded sheet metal and by welding these to each other, the door cavity is created therebetween.

Since the door main body has a welded unified structure formed of the inner panel and the outer panel which have been press molded to obtain work hardening, a weight of the door main body can be reduced but still the door main body can be easily provided with strength required as door, and as a result, accessories for reinforcement becomes unnecessary.

In addition, the accessories can be assembled directly to the inner panel, and with this configuration, it becomes unnecessary to use special parts for attaching accessories.

Moreover, the accessory which is not desired to be exposed, such as a catcher for retaining the door in a closed state and a cancel mechanism for releasing the catcher, is brought into the cavity of the door main body and assembled to the accessory attaching portion of the inner panel through the accessory access opening, and thus assembly in the cavity of the door main body is facilitated. With this configuration, it becomes unnecessary to use special covers for various different accessories.

Further, since the accessory attaching portion is formed in the inner panel, a shape of the outer panel can be made simple, and by covering the accessory access opening with the decorative cover, the appearance of the door and cabin can be enhanced.

Therefore, the number of components of the door can be reduced to thereby facilitate door production and parts control, while strength required as door is still secured.

In one preferred embodiment of the present invention, each of the inner panel and the outer panel has an inner periphery edge defining a window opening, a window panel for opening and closing the window opening and a window regulator for an opening-closing operation of the window panel are provided as the accessories, and a gap is formed between the inner periphery edge of the inner panel and the inner periphery edge of the outer panel, the gap allowing insertion of the window panel from the window opening into the door cavity.

With this configuration, the window regulator can be brought into the door cavity through the accessory access opening, and assembled to the accessory attaching portion of the inner panel, and thus the assembly in the cavity of the door main body is facilitated. The window panel can be easily assembled to the door main body in a state in which an opening-closing operation is enabled, by: inserting the window panel into the cavity of the door main body from the window opening through a gap between the inner periphery of the inner panel and the inner periphery of the outer panel; receiving the window panel with a hand put into the door cavity from the accessory access opening; and attaching the window panel to the window regulator.

In another preferred embodiment of the present invention, the accessory attaching portion is formed of a recess or a projection of the inner panel. By performing deep drawing for forming recesses and projections, work hardening of the inner panel can be obtained, and as a result, strength of the door can be enhanced.

In still another preferred embodiment of the present invention, a hinge attaching portion as the accessory attaching portion is formed of the recess of the inner panel, and a door connecting hinge as the accessory is connected to the inner panel with a bolt with the outer panel being sandwiched between the door connecting hinge and the recess of the inner panel. With this configuration, by performing deep drawing for forming the hinge attaching portion, work hardening of the hinge attaching portion can be obtained. By sandwiching the outer panel between the hinge attaching portion and the hinge, a plate thickness of the hinge attaching portion in the door can be enlarged.

In still more preferred embodiment of the present invention, a lower end portion of the outer panel has a drainage hole for discharging water from the door cavity. Further, an outer handle attaching portion for attaching an outer handle is formed of a recess of the outer panel.

With respect to the assembly of the outer handle, the fixture, such as bolts or nuts for fixing outer handle, can be brought into the cavity of the door main body through the accessory access opening. Accordingly, by simply forming a mounting hole for outer handle in the outer handle attaching portion during press molding, the outer handle can be assembled to the outer panel without necessitating welding of the fixture, such as bolt or nut, to the outer handle attaching portion after press molding.

In addition, since the outer handle is positioned at the handle attaching portion formed as a recess in the door cavity, an amount of transversal and outward projection of the assembled outer handle from the outer panel can be made small.

BRIEF DESCRIPTION OF THE DRAWINGS

FIG. 9 is a longitudinal sectional front view of a main portion showing an assembly state of a window panel and the like.

FIG. 11 is a side view of a main portion showing an operation structure of a window panel and the like.

DETAILED DESCRIPTION OF THE PREFERRED EMBODIMENTS

Hereinbelow, as one embodiment for carrying out the present invention, an embodiment in which a door of a cabin for work vehicle according to the present invention applied to a multipurpose work vehicle will be described with reference to the drawings. In the following descriptions, the terms "right", "left", "front", "rear", "upper (upward)" and "lower (downward)" refer to the respective directions seen from a driver seated in a driver's seat. The terms "longitudinal" and "transversal" refer to the respective directions (a front-rear direction and a right-left direction) of the vehicle body. The terms "inner (inward)" and "outer (outward)" refer to relative positions relative to the vehicle body.

Figure 1:
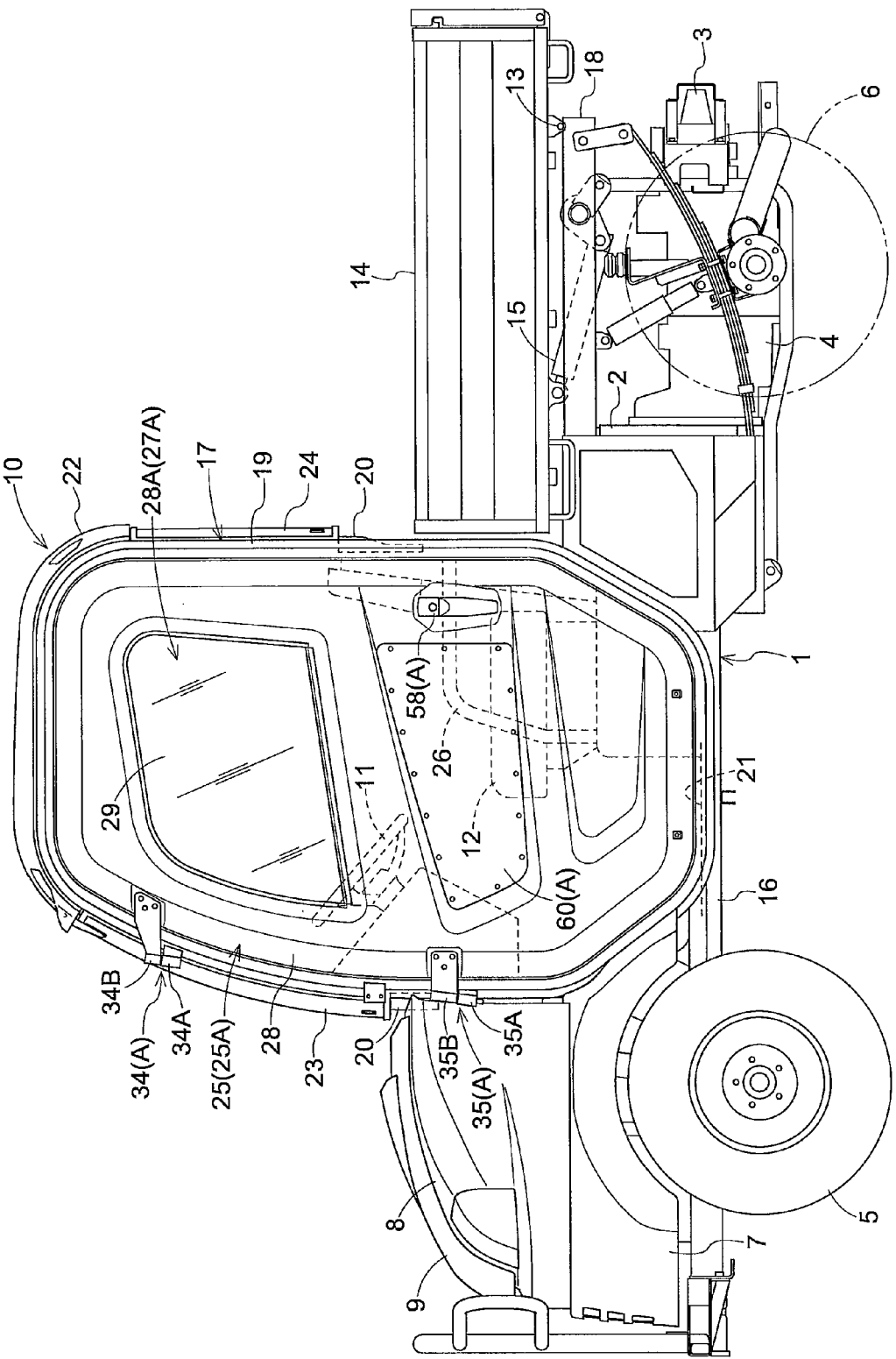
FIG. 1 is a left side view of an entire multipurpose work vehicle.
Figure 2:
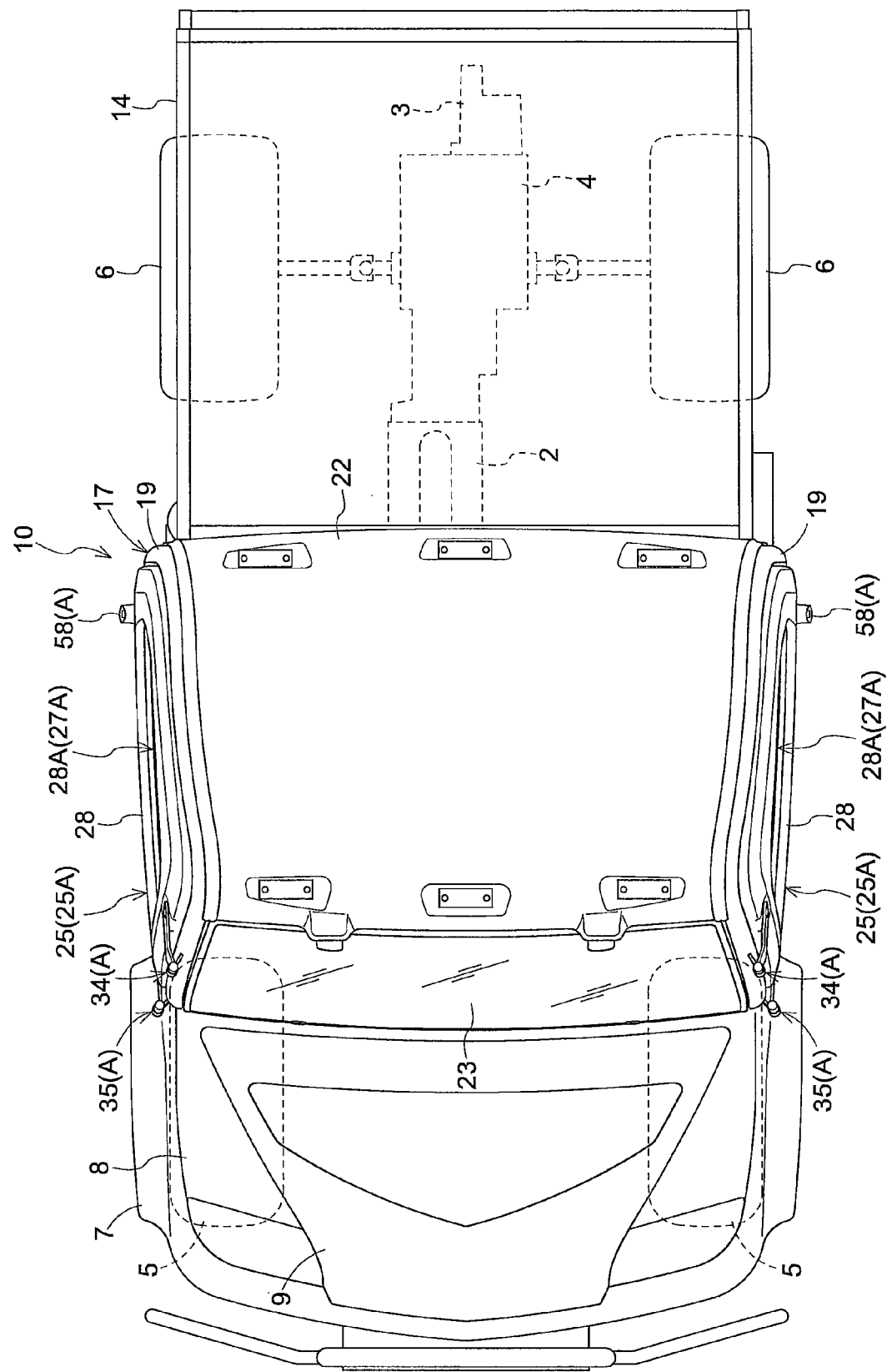
FIG. 2 is an entire plan view of the multipurpose work vehicle.
Figure 3:
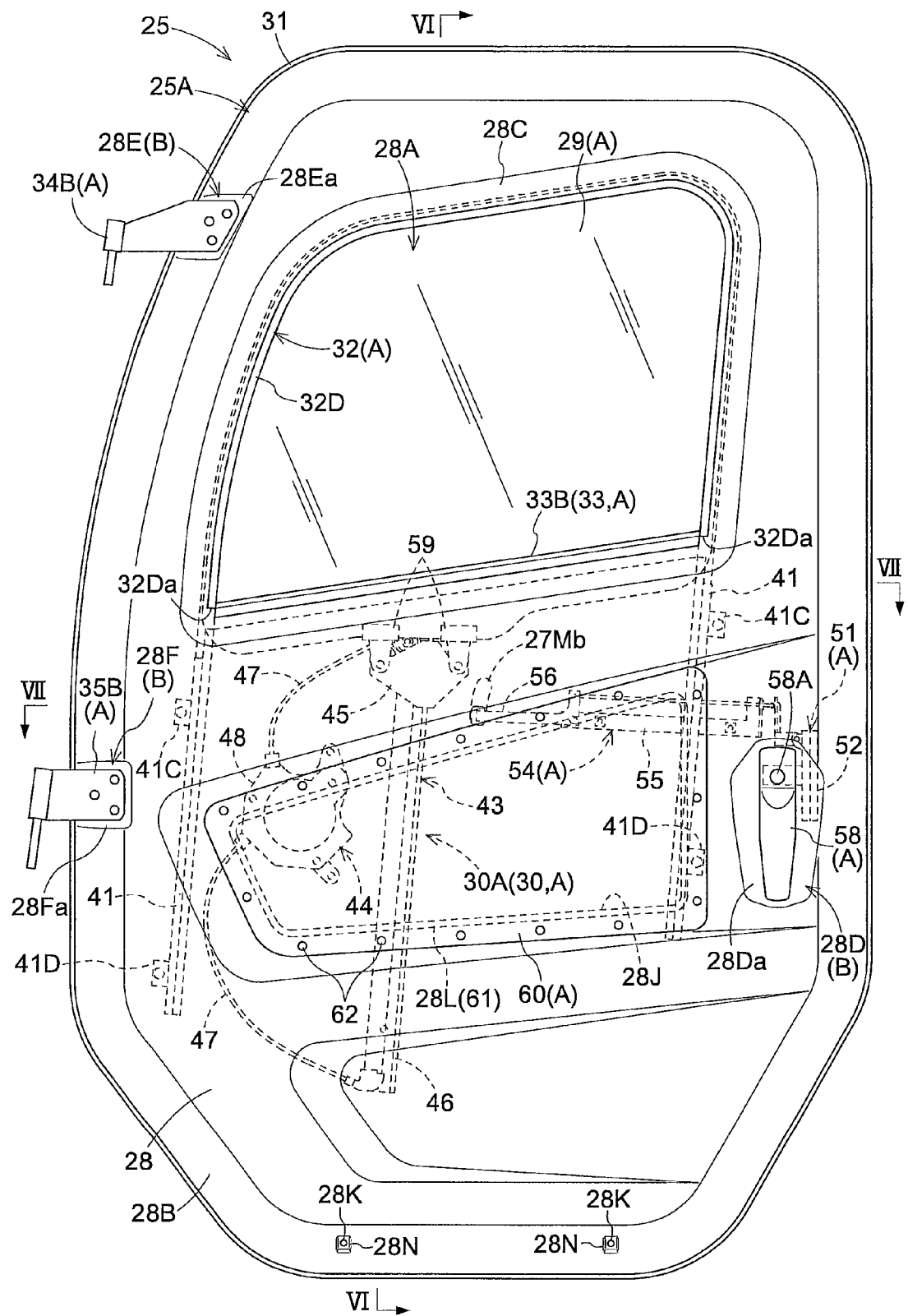
FIG. 3 is a side view on an outer panel side of a door.
Figure 4:
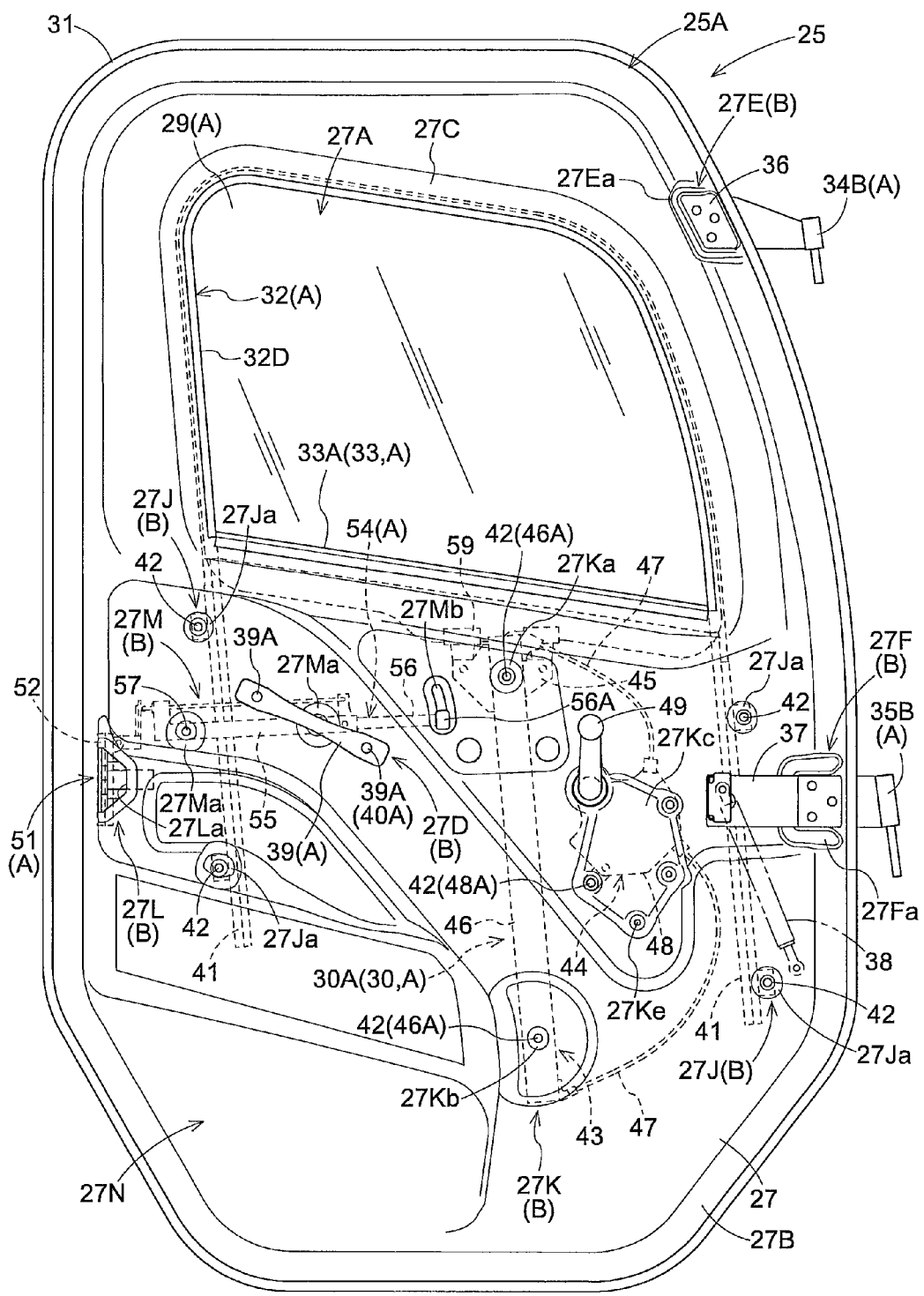
FIG. 4 is a side view on an inner panel side of the door with a manually-operated window regulator.
Figure 5:
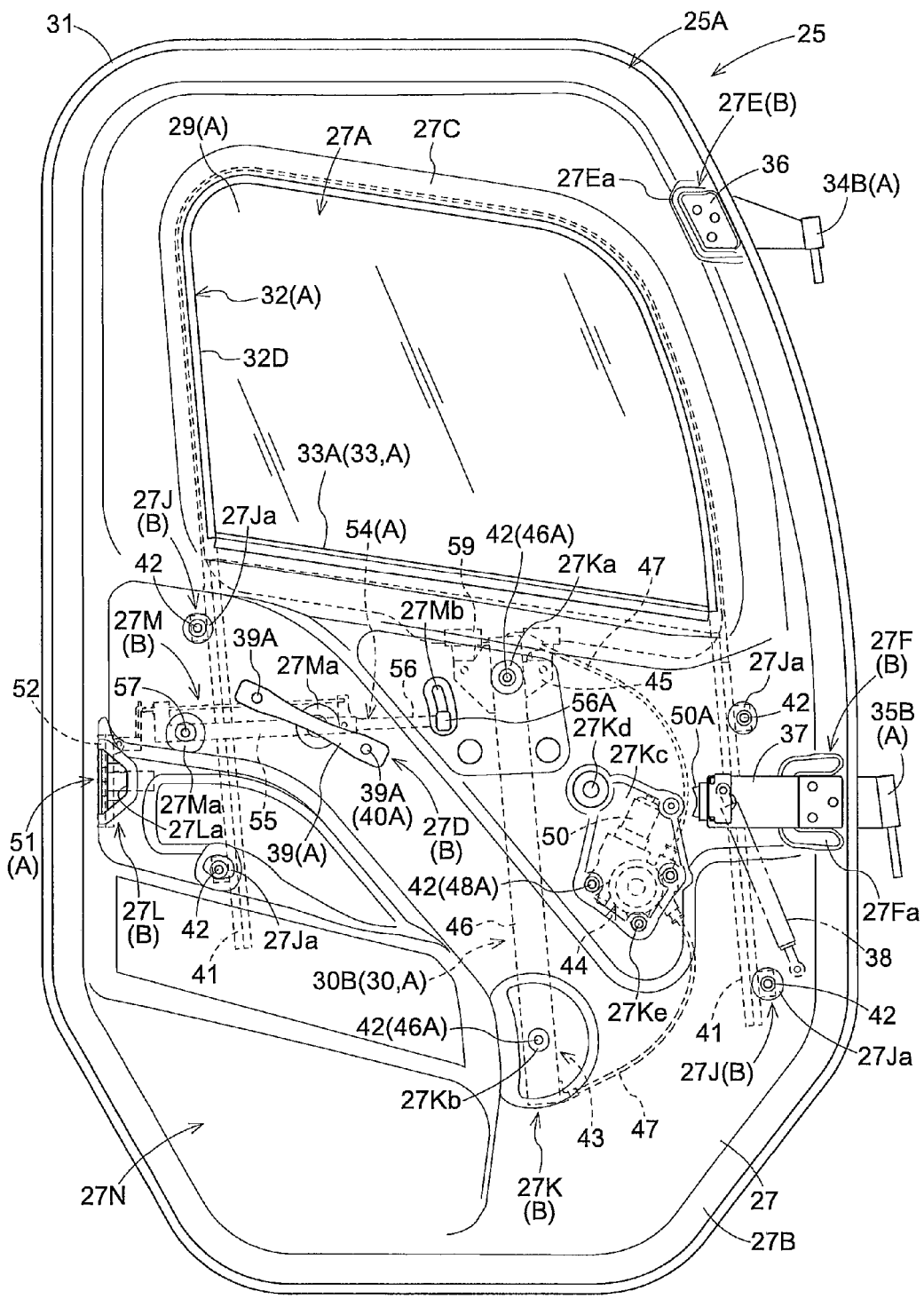
FIG. 5 is a side view on the inner panel side of the door with an electrically-operated window regulator.
Figure 6:
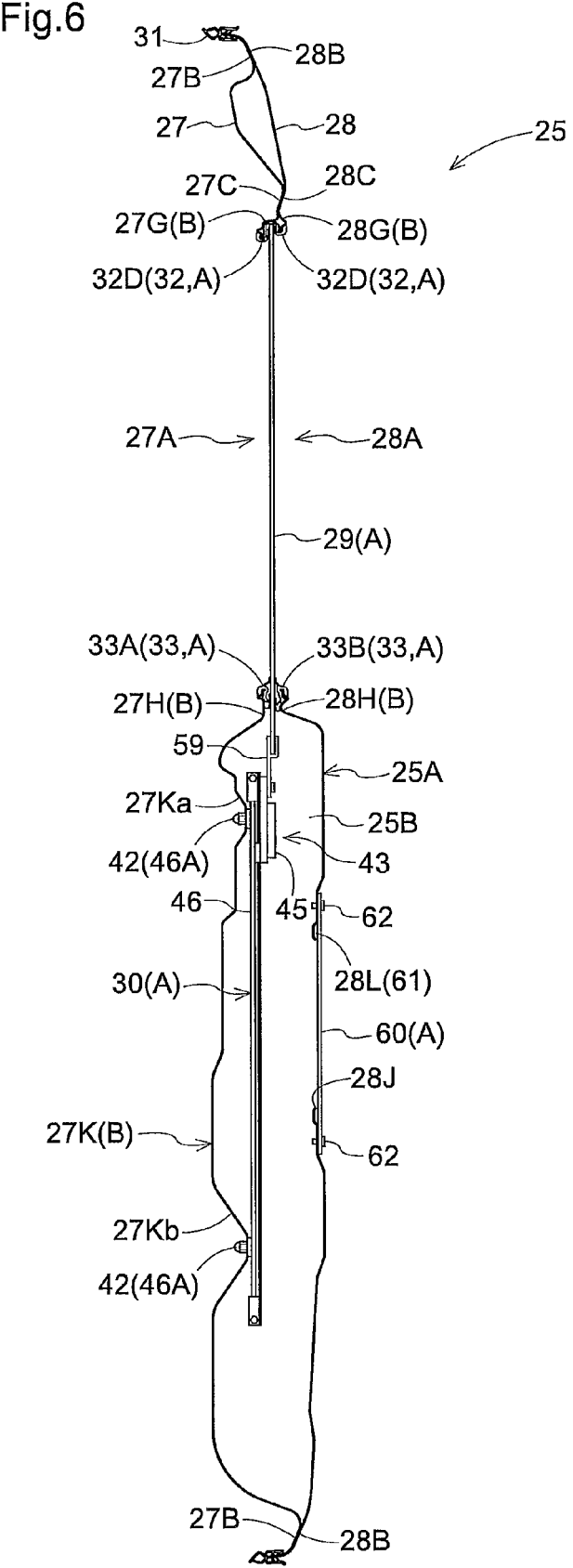
FIG. 6 is a cross-sectional view taken along a line VI-VI of FIG. 3.
Figure 7:
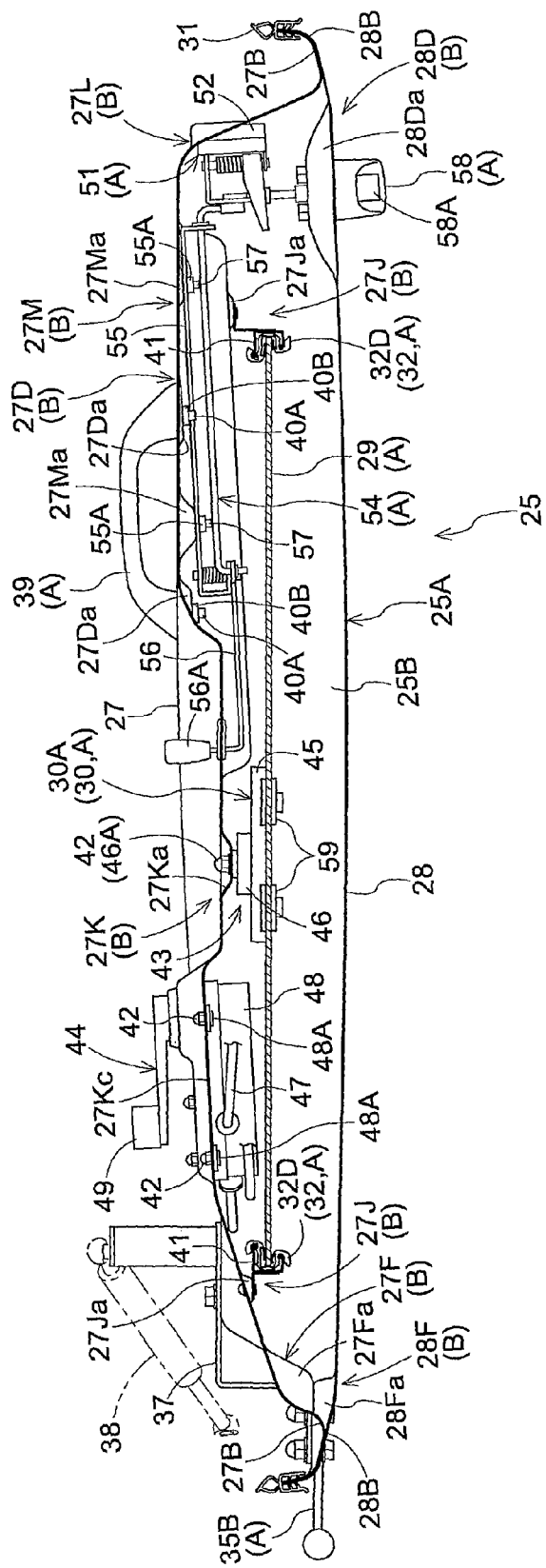
FIG. 7 is a cross-sectional view taken along a line VII-VII of FIG. 3.
Figure 8:
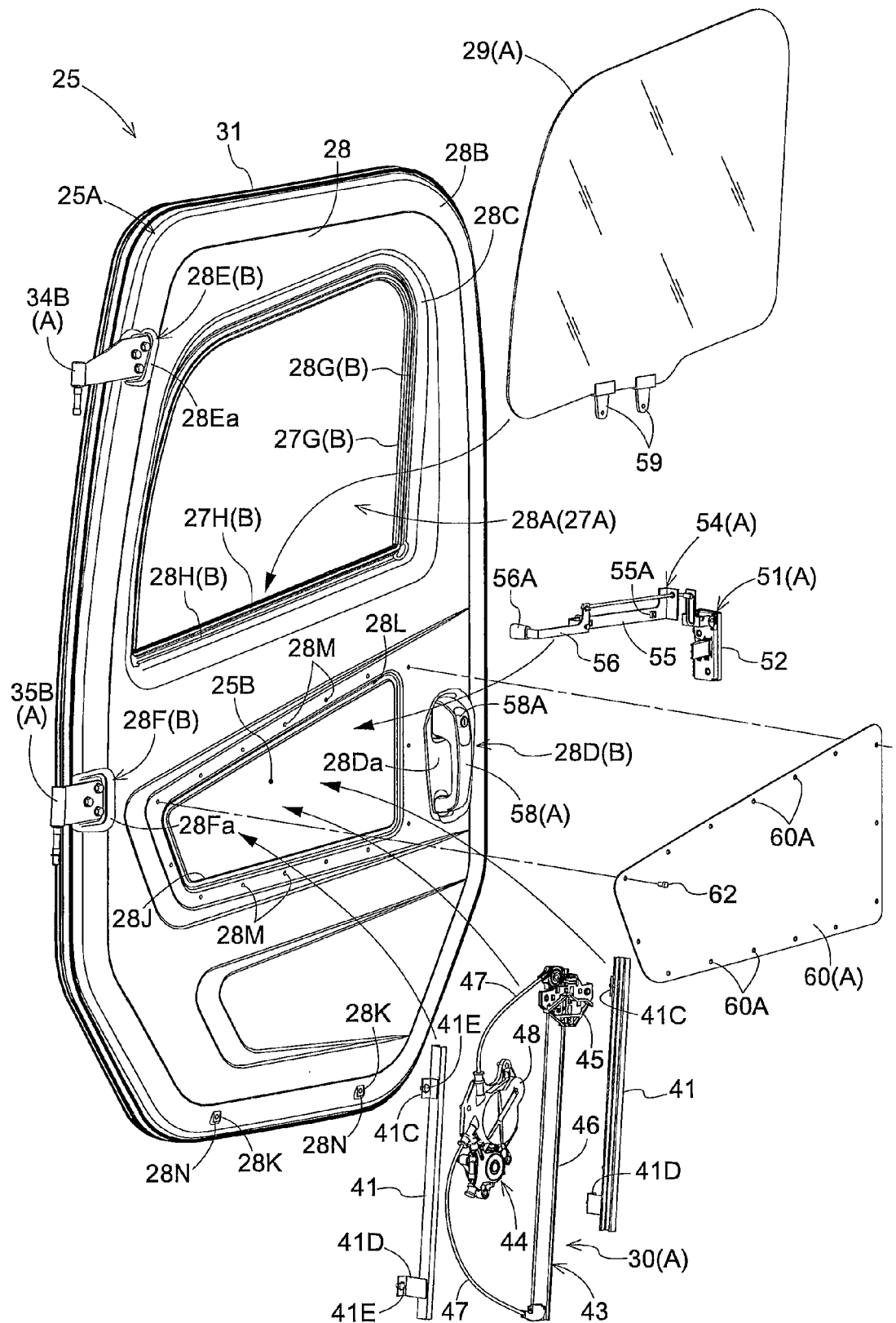
FIG. 8 is an exploded perspective view showing a configuration of the door.

As shown in FIGS. 1 and 2, a multipurpose work vehicle illustrated in the present embodiment is configured as four-wheel drive type in such a manner that a power from an engine 2 supported by a body frame 1 in a vibration-proof manner is transmitted to a pair of right and left front wheels 5 and a pair of right and left rear wheels 6 through a hydrostatic continuously variable transmission device 3, a gear type transmission device 4 and the like.

In a front portion of the multipurpose work vehicle, there are disposed a lower cover 7 also serving as front wheel fenders, an upper cover 8 having an opening formed in an upper portion at an intermediate position in a transversal direction, a swingable open-close cover 9 for closing the opening, and the like, and these components form a storage space.

In an intermediate portion in a longitudinal direction of the multipurpose work vehicle, a cabin 10 forming a riding space is disposed, in which a steering wheel 11 for front wheel steering, a bench type seat 12, and the like are disposed.

In a rear portion of the multipurpose work vehicle and above the gear type transmission device 4, a truck box 14 is disposed which swings vertically about a transversal shaft 13 as fulcrum that is disposed in a rear end portion of the body frame 1. A hydraulic type dump cylinder 15 for swingably driving the truck box 14 is disposed so as to span from the body frame 1 to the truck box 14 between the gear type transmission device 4 and the truck box 14.

The body frame 1 is configured to have a welded unified structure obtained by welding various steels so that a front frame 16, a cabin frame 17 and a rear frame 18 are contiguously connected with high strength.

The cabin frame 17 includes: right and left side frames 19 each forming an entrance; and a plurality of cross members 20 and a floor panel 21, each bridging the frames 19 and being welded to the frames 19. The cabin 10 includes: an outer roof 22 made of resin; an outswinging type front panel 23 mainly formed of a transparent curved glass plate; an outswinging type rear panel 24 mainly formed of a transparent curved glass plate; outswinging right and left doors 25 each mainly formed of a press steel plate; and the like, all of which attached to the cabin frame 17. The cabin frame 17 is provided with handrails 26 disposed at positions on both right and left sides of the seat 12, each of which is formed of a round pipe bent in an L-shape and for aiding to climb in and out of the vehicle.

As shown in FIGS. 1, 2, 9 and 10, each of the right and left side frames 19 is formed of a plurality of odd-shaped pipes each having a pair of elongated recesses 19A, 19B each of which has an L-shaped cross section facing to the other, while the pipes are welded as a closed loop in such a manner that the recess 19A (19B) is contiguously connected. The frame 19 is formed in an outward curved (or bulging) shape in such a manner that, in an upper half of the side frame 10, a portion at a higher level is positioned more inward relative to the vehicle body. In each of the side frame 19, a laterally outward-directed face 19a of the recess 19A positioned laterally outward relative to the vehicle body is formed which serves as a door receiving face for receiving the corresponding door 25.

As shown in FIGS. 1-11, each of the right and left doors 25 includes: a door main body 25A formed of an inner panel 27 and an outer panel 28 each made of a press-molded sheet metal in such a manner that the inner panel 27 and the outer panel 28 are provided with an opening 27A and an opening 28A for window, respectively, as well as a plurality of accessory attaching portions B: and a plurality of accessories A, such as a window panel 29 for opening and closing the window openings 27A, 28A and a window regulator 30 for enabling an opening-closing operation of the window panel 29 and the like, assembled to the door main body 25A. As the window panel 29, a curved glass plate is adopted which has a curved shape as a planar view and front and rear end edge portions each of which extends vertically in a straight line.

Each of the right and left door main bodies 25A is configured as a hollow welded unified structure in which a weight thereof is reduced but high strength is secured, by spot-welding a plurality of portions where the inner panel 27 and the outer panel 28 are joined each other, including end edge portions of outer peripheries 27B, 28B and front, rear and upper edge portions from among end edge portions of inner peripheries 27C, 28C defining the window opening 27A, 28A. In a door cavity 25B formed between the inner panel 27 and the outer panel 28, the built-in type accessories A, such as the window regulator 30, are disposed.

The door cavity 25B has flattened cross sectional shape along a whole circumference between the end edge portion of the outer periphery 27B (28B) and the end edge portion of the inner periphery 27C (28C) of the inner panel 27 (outer panel 28).

As shown in FIGS. 1-10, each of the inner panel 27 and the outer panel 28 on each of the right and left sides are press-molded in such a manner that the outer peripheries 27B,28B follow the corresponding side frame 19. With this configuration, upper halves thereof are formed in the outward curved (or bulging) shape in the same manner as the corresponding upper half of the side frame 19. In addition, the end edge portion of each of the outer peripheries 27B, 28B is press-molded so as to have a laterally extending shape towards the corresponding door receiving face 19a of the side frame 19, and on the end edge portions, there is fitted a weather strip 31 to be brought into contact with the door receiving face 19a of the corresponding side frame 19.

As shown in FIGS. 3-10, the inner panel 27 on each of the right and left sides is press-molded so as to have: an inner handle attaching portion 27D, a hinge attaching portion 27E, a damper bracket attaching portion 27F, a glass run attaching portion 27G, a weather strip attaching portion 27H, front and rear window rail attaching portions 27J, a window regulator attaching portion 27K, a catcher attaching portion 27L and a cancel mechanism attaching portion 27M, all as the accessory attaching portions B; a recess 27N for securing a clearance from the handrail 26; and the like.

The outer panel 28 on each of the right and left side is press-molded so as to have: an outer handle attaching portion 28D, an upper hinge attaching portion 28E, a lower hinge attaching portion 28F, a glass run attaching portion 28G, and a weather strip attaching portion 28H, all as the accessory attaching portions B; an accessory access opening 28J and front and rear drainage holes 28K; and the like.

In other words, by not forming the accessory access opening 28J in the inner panel 27 on a vehicle interior side, the inner panel 27 with no accessory access opening 28J faces the entrance of the cabin 10 and closes the entrance when the door 25 is closed, and thus sealability and sound insulation by the door 25 can be enhanced.

The inner handle attaching portion 27D is provided with front and rear recesses 27Da, each of which is positioned in a rear upper portion of a lower half of the inner panel 27 and has a mounting hole (not shown) for inner handle.

The hinge attaching portion 27E is provided with a recess 27Ea which is positioned in a front upper end portion in the outer periphery 27B of the inner panel 27 and capable of being joined with the outer panel 28, and has three mounting holes (not shown) for upper hinge.

The damper bracket attaching portion 27F is provided with a recess 27Fa which is positioned in a front portion of a lower half of the outer periphery 27B of the inner panel 27 and capable of being joined with the outer panel 28, and has three mounting holes (not shown) for both damper bracket and lower hinge and two mounting holes (not shown) specialized for damper bracket so as to serve also as a hinge attaching portion.

The glass run attaching portion 27G of the inner panel 27 is formed of the front, rear and upper edge portions of the inner periphery 27C in the inner panel 27. The inner periphery 27C includes, along approximately a whole circumference thereof: an engaging portion 27Ca having an L-shaped cross section in which the end edge portion is bent laterally towards the outer panel 28; and an engagement recess 27Cb which is provided on an outer periphery side of the engaging portion 27Ca and has a lying V-shaped cross section with its bottom projecting to a lateral side opposite to a side of the outer panel 28. In addition, on an outer periphery side of the engagement recess 27Cb in the front, rear and upper edge portions, a glass run receiving portion 27Cc extending laterally towards the outer panel 28 is provided along an entire length of the front, rear and upper edge portions. The engaging portion 27Ca and the receiving portion 27Cc provided in the front, rear and upper edge portions are used for attaching a glass run 32 as accessory A.

The weather strip attaching portion 27H of the inner panel 27 is formed of a lower edge portion of the inner periphery 27C, and the engaging portion 27Ca and the engagement recess 27Cb provided in the lower edge portion are used for attaching a weather strip 33 as accessory A.

Each of the front and rear edge portions of the inner periphery 27C extends, when seen from a front, in a straight line and in an inclined posture sloping downward from a vehicle body inner side at an angle that is suited to the upper half of the inner panel 27 having the outward curved (or bulging) shape as described above. Each of the upper and lower edge portions of the inner periphery 27C is, when seen from above, curved along the corresponding window panel 29.

Of the front and rear window rail attaching portions 27J, the front window rail attaching portion 27J is positioned in a front portion of the lower half of the inner panel 27, and the rear window rail attaching portion 27J is positioned in a rear portion of the lower half of the inner panel 27, each of which is provided with upper and lower recesses 27Ja having respective mounting holes (not shown) for attaching a window rail.

The window regulator attaching portion 27K is positioned between the inner handle attaching portion 27D and the front window rail attaching portion 27J in the lower half of the inner panel 27, and includes: an upper recess 27Ka and a lower recess 27Kb which are different in depth, each provided with a mounting hole (not shown) for slide mechanism of the window regulator 30; a bulging part 27Kc for attaching an operation mechanism of the window regulator 30; an insertion hole 27Kd for operation shaft, formed in the bulging part 27Kc (see FIG. 5); and mounting holes 27Ke for operation mechanism, formed around the bulging part 27Kc. Of the upper recess 27Ka and the lower recess 27Kb, the lower recess 27Kb is formed to have a depth greater than that of the upper recess 27Ka. As the mounting hole 27Ke for operation mechanism, there are formed two types including one for a manual operation and the other for an electrical operation. With this configuration, a specification change can be easily performed between a specification in which a manually-operated window regulator 30A is used and a specification in which an electrically-operated window regulator 30B is used.

The catcher attaching portion 27L is positioned in a rear end portion of the lower half of the inner panel 27, and is provided with an opening 27La for inserting a striker, and four mounting holes (not shown) for catcher.

The cancel mechanism attaching portion 27M is positioned between the window regulator attaching portion 27K and the catcher attaching portion 27L in an upper portion of the lower half of the inner panel 27, and is provided with front and rear recesses 27Ma each having a mounting hole (not shown) for cancel mechanism and an elongate hole 27Mb for release lever.

To sum up, by providing numerous accessory attaching portions A as described above in the inner panel 27, the inner panel 27 is to be press-molded in a complex shape with numerous the recesses and projections which exerts high work hardening, and as a result, without using reinforcing members or the like, strength of the door 25 can be enhanced.

The recess 27N for handrail is formed in a lower rear portion of the inner panel 27 in such a manner that, when the door 25 is closed, the recess 27N faces the handrail 26 disposed laterally next to the seat 12 and secures a clearance from the handrail 26. In this manner, by forming the recess 27N for handrail in the inner panel 27 of the door 25, the seat 12 can be made wide in the transversal direction, while the handrail 26 is provided which is disposed on a lateral side of the seat 12 for facilitating climbing in and out of the vehicle from the entrance, and furthermore, by work hardening of the inner panel 27, strength of the door 25 can be enhanced.

The outer handle attaching portion 28D is provided with a recess 28Da which is positioned in a rear upper portion of a lower half of the outer panel 28 and has three mounting holes (not shown) for outer handle.

The upper hinge attaching portion 28E is provided with a recess 28Ea which is positioned in a front upper end portion in the outer periphery 28B of the outer panel 28 where it faces the hinge attaching portion 27E of the inner panel 27, and is capable of being joined with the hinge attaching portion 27E of the inner panel 27, and has three mounting holes (not shown) for upper hinge at positions corresponding to the positions of the mounting holes on an inner panel side.

The lower hinge attaching portion 28F is provided with a recess 28Fa which is positioned in a front portion of a lower half in the outer periphery 28B of the outer panel 28 where it faces the damper bracket attaching portion 27F of the inner panel 27, and is capable of being joined with the damper bracket attaching portion 27F of the inner panel 27, and has three mounting holes (not shown) for both lower hinge and damper bracket at positions corresponding to the positions of the mounting holes on the inner panel side.

The glass run attaching portion 28G of the outer panel 28 is formed of the front, rear and upper edge portions of the inner periphery 28C in the outer panel 28. The inner periphery 28C includes, along approximately a whole circumference thereof: an engaging portion 28Ca having an L-shaped cross section in which the end edge portion is bent laterally towards the inner panel 27; and an engagement recess 28Cb which is provided on an outer periphery side of the engaging portion 28Ca and has a lying V-shaped cross section with its bottom projecting to a lateral side opposite to a side of the inner panel 27. The engaging portion 28Ca provided in the front, rear and upper edge portions is used for attaching the glass run 32.

The weather strip attaching portion 28H of the outer panel 28 is formed of a lower edge portion of the inner periphery 28C, and the engaging portion 28Ca and the engagement recess 28Cb provided in the lower edge portion are used for attaching the weather strip 33.

Each of the front and rear edge portions of the inner periphery 28C extends, when seen from a front, in a straight line and in an inclined posture sloping downward from the vehicle body inner side at an angle that is suited to the upper half of the outer panel 28 having the outward curved (or bulging) shape as described above. Each of the upper and lower edge portions of the inner periphery 28C is, when seen from above, curved along the corresponding window panel 29.

In other words, by providing the minimum necessary accessory attaching portions A as described above to the outer panel 28, a shape of the outer panel 28 forming an outer face of the cabin 10 can be made simple with less recesses and projections, and thus an appearance of the cabin 10 can be enhanced.

The accessory access opening 28J is formed between the outer handle attaching portion 28D and the lower hinge attaching portion 28F in the lower half of the outer panel 28 and configured to have an opening space with a width in the longitudinal direction approximately the same as that of the window opening 28A which allows the window regulator 30 and the like to be brought into and assembled to the cavity 25B of the door main body 25A. Around the opening 28J, a seal groove 28L in a shape of a closed loop is formed, and around the seal groove 28L, a plurality of mounting holes 28M for mounting a decorative cover are formed at predetermined intervals in a circumferential direction.

The drainage hole 28K is formed in each of front and rear drainage portions 28N which protrudes in a lower end portion of the outer periphery 28B of the outer panel 28 and is configured to have a communicating passage (not shown) in communication with both the cavity 25B of the door main body 25A and the drainage hole 28K.

Referring to FIGS. 1-5, 7, 8 and 10, in each of the right and left doors 25, an upper hinge 34 and a lower hinge 35 as accessories A for connecting a door are formed of shaft side members 34B,35B provided in each of the right and left doors 25 and shaft receiving members 34A,35A provided in each of the right and left side frames 19, which are configured to be insertable and removable in such a manner that the shaft side members 34B,35B can be inserted from above into the respective shaft receiving members 34A,35A to thereby easily attach the right and left doors 25 to the right and left side frames 19, respectively, so as to swingably open and close the door 25.

The shaft receiving members 34A, 35A of the respective hinges 34, 35 are welded at predetermined positions of the right and left side frames 19. The shaft side member 34B of each of the right and left upper hinges 34 has three mounting holes (not shown) formed therein corresponding to the mounting holes on a door side. The shaft side member 34B of each of the right and left upper hinges 34, together with an auxiliary plate 36 having three mounting holes corresponding to the mounting holes described above, is connected to the door main body 25A with bolts utilizing the hinge attaching portion 27E of the inner panel 27 and the upper hinge attaching portion 28E of the outer panel 28, in a state in which the shaft side member 34B and the auxiliary plate 36 sandwich the inner panel 27 and the outer panel 28 therebetween and thus high strength is exerted. The shaft side member 35B of each of the right and left lower hinges 35 has three mounting holes (not shown) formed therein corresponding to the mounting holes on the door side. The shaft side member 35B of each of the right and left lower hinges 35, together with a damper bracket 37 whose first end portion has three mounting holes corresponding to the mounting holes described above, is connected to the door main body 25A with bolts utilizing the damper bracket attaching portion 27F of the inner panel 27 and the lower hinge attaching portion 28F of the outer panel 28, in a state in which the shaft side member 35B and the first end portion of the damper bracket 37 sandwich the inner panel 27 and the outer panel 28 therebetween and thus high strength is exerted.

On a second end portion opposite to the first end portion of each of the right and left damper brackets 37, there are formed two mounting holes (not shown) corresponding to the mounting holes specialized for damper bracket formed in the damper bracket attaching portion 27F, and the second end portion is connected to the inner panel 27 with bolts utilizing these mounting holes. In addition, the second end portion is connected to one end portion of a gas damper 38 disposed between the corresponding side frame 19 and the damper bracket 37 so as to assist an opening-closing operation of the door 25.

As shown in FIGS. 3-10, in each of the right and left doors 25, an inner handle 39 as accessory A is formed in a U-shape whose both end portions have mounting holes 39A. The inner handle 39 can be easily assembled to the inner handle attaching portion 27D of the inner panel 27, by: on the inner panel side of the door main body 25A, aligning the mounting holes 39A with the respective mounting holes of the inner handle attaching portion 27D; on the inner panel side of the door main body 25A, inserting bolts 40A into the respective mounting holes; bringing nuts 40B into the cavity 25B of the door main body 25A through the accessory access opening 28J; and screwing each of the nuts 40B with an inserted end of the corresponding bolt 40A projecting into the cavity 25B of the door main body 25A.

Figure 10:
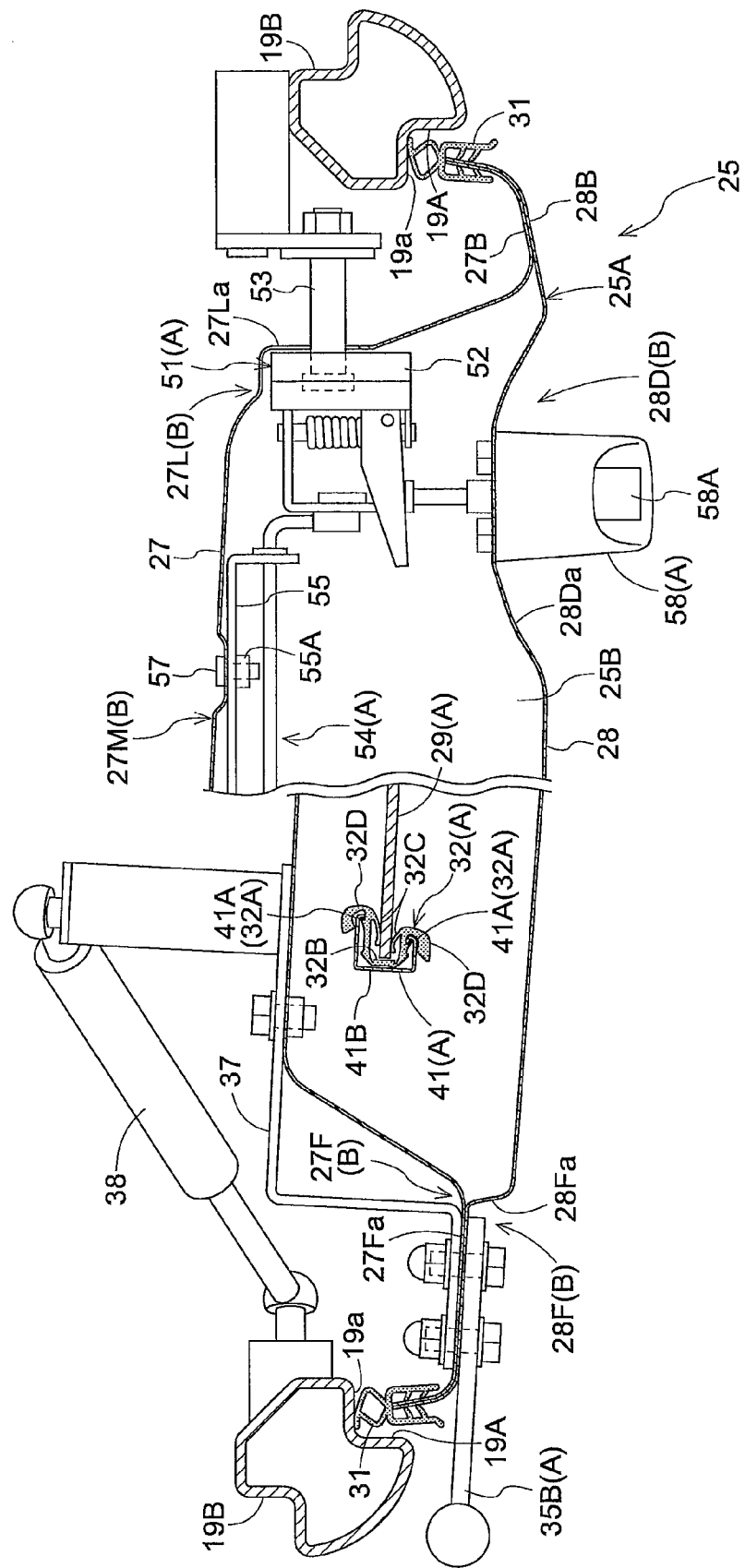
FIG. 10 is a transversal sectional plan view of a main portion showing the configuration of the door.
Figure 11:
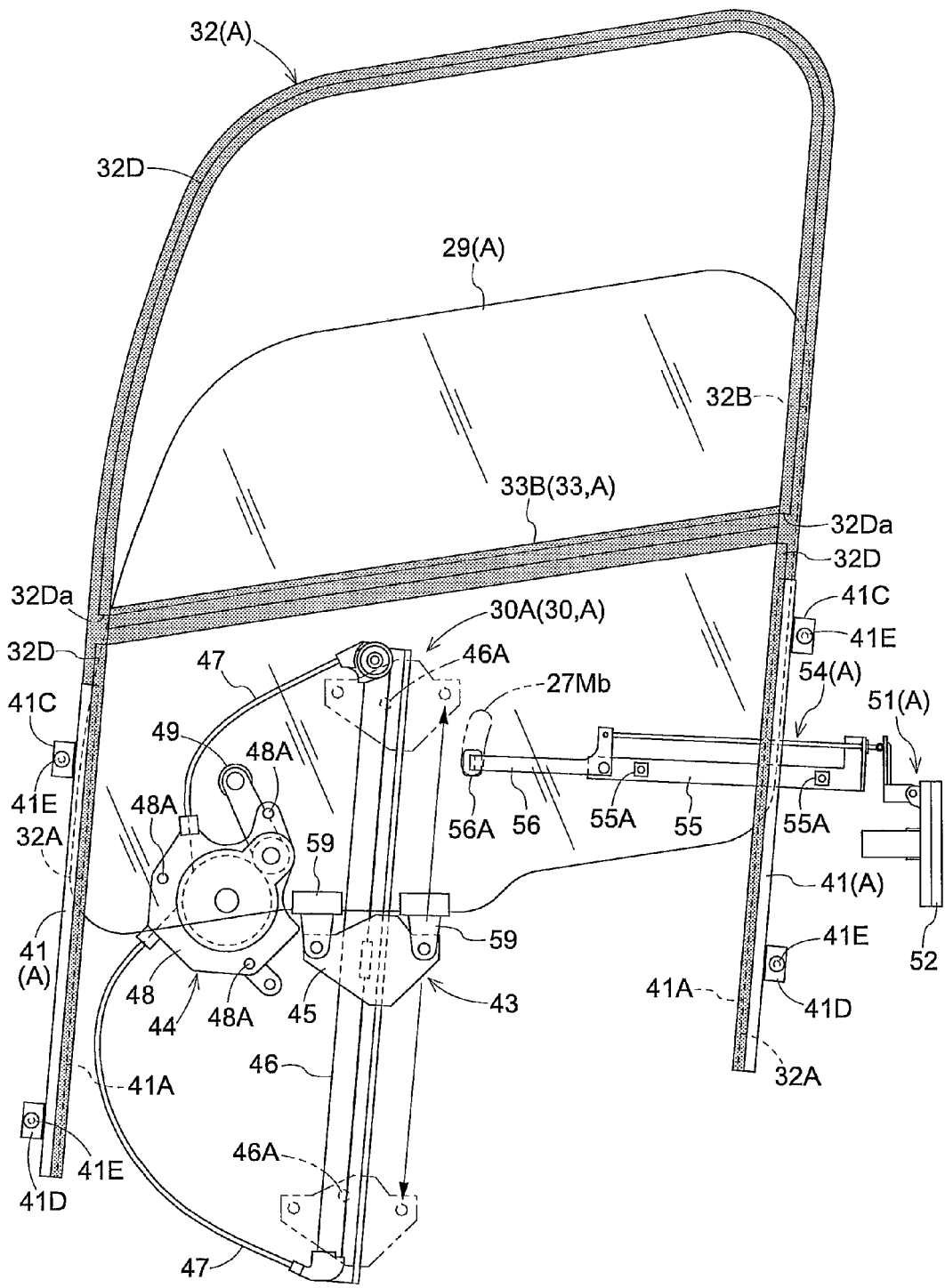

Referring to FIGS. 10 and 11, each of front and rear window rails 41 as accessories A is configured in a straight line with a U-shaped cross section, the window rail 41 including, along an entire length thereof a pair of glass run engaging portions 41A; and a glass run receiving portion 41B. The window rail 41 is provided with a short leg 41C in an upper portion thereof and a long leg 41D in a lower portion thereof, and to each of legs 41C,41D, a weld bolt 41E is attached. The front and rear window rails 41 can be easily assembled to the front and rear window rail attaching portions 27J of the inner panel 27, respectively, in such a manner that the front window rail 41 is positioned under a front edge portion of the window opening 27A,28A and aligned with the front edge portion as a straight line in an inclined posture sloping downward from the vehicle body inner side, and the rear window rail 41 is positioned under a rear edge portion of the window opening 27A,28A and aligned with the rear edge portion as a straight line in an inclined posture sloping downward from the vehicle body inner side. This can be attained by: bringing the weld bolts 41E into the cavity 25B of the door main body 25A through the accessory access opening 28J; inserting the weld bolts 41E from the cavity 25B of the door main body 25A into the respective mounting holes of the window rail attaching portion 27J; and screwing hexagon cap nuts 42 with the respective weld bolts 41E exposed in the recess 27Ja of the window rail attaching portion 27J.

The window regulator 30 includes: a slide mechanism 43 for enabling an opening-closing movement of the window panel 29; and an operation mechanism 44 for enabling the opening-closing operation of the window panel 29. The slide mechanism 43 includes: a sliding body 45 for supporting the window panel 29 from below slidably with the window panel 29 in a unified manner; and a guide rail 46 for slidably guiding the sliding body 45, in such a manner that the sliding body 45 is allowed to slidably move by a movement of an operation cable 47 whose both end portions are connected to the sliding body 45. In upper and lower portions of the guide rail 46, weld bolts 46A are provided. In the case of the manual operation type, the operation mechanism 44 is configured in such a manner that the sliding body 45 is slidably operated in a direction in accordance with a direction of winding of the operation cable 47 achieved by a rotating operation of an operation handle 49 detachably and integrally rotatably attached to an operation shaft (not shown) projecting from a casing 48 of the operation mechanism 44. In the case of the electrical operation type, the operation mechanism 44 is configured in such a manner that the sliding body 45 is slidably operated in a direction in accordance with a direction of winding of the operation cable 47 achieved by actuation of an electric motor 50 provided in the casing 48. In the casing 48, three weld bolts 48A are provided at predetermined positions.

The slide mechanism 43 can be easily assembled to the window regulator attaching portion 27K of the inner panel 27, in such a manner that the guide rail 46 is in an inclined posture sloping downward from a vehicle body inner side along the front and rear window rails 41, by: bringing the window regulator 30 into the cavity 25B of the door main body 25A through the accessory access opening 28J; inserting the weld bolts 46A of the guide rail 46 from the cavity 25B of the door main body 25A into the respective mounting holes for slide mechanism of the window regulator attaching portion 27K; and screwing the hexagon cap nuts 42 with the respective weld bolts 46A exposed in recesses 27Ka, 27Kb for slide mechanism. In addition, in the case of the manual operation type, the operation mechanism 44 can be easily assembled to the window regulator attaching portion 27K of the inner panel 27, by: inserting the operation shaft from the cavity 25B of the door main body 25A into the insertion hole 27Kd for operation shaft; inserting the weld bolts 48A of the casing 48 from the cavity 25B of the door main body 25A into the respective mounting holes 27Ke for operation mechanism of the window regulator attaching portion 27K; attaching the operation handle 49 to the operation shaft protruding from the insertion hole 27Kd for operation shaft; and screwing the hexagon cap nuts 42 with the respective weld bolts 48A exposed from the respective mounting holes 27Ke for operation mechanism. In the case of the electrical operation type, the operation mechanism 44 can be easily assembled to the window regulator attaching portion 27K of the inner panel 27 and the damper bracket 37, by: inserting the weld bolts 48A of the casing 48 from the cavity 25B of the door main body 25A into the respective mounting holes 27Ke for operation mechanism of the window regulator attaching portion 27K; screwing the hexagon cap nuts 42 with the respective weld bolts 48A exposed from the respective mounting holes 27Ke for operation mechanism; and attaching a switch 50A for operating an electric motor to the second end portion of the damper bracket 37.

A catcher 51 as accessory A includes a base plate 52 having four screw holes (not shown) which correspond to the respective mounting holes of the catcher attaching portion 27L. The catcher 51 can be easily assembled to the catcher attaching portion 27L of the inner panel 27 in a state in which a catch mechanism (not shown) peeks the opening 27La for inserting a striker, by: bringing the catcher 51 into the cavity 25B of the door main body 25A through the accessory access opening 28J; aligning screw holes of the base plate 52 with the respective mounting holes of the catcher attaching portion 27L; inserting bolts (not shown) into the respective mounting holes of the catcher attaching portion 27L from a rear outer side of the door 25; and screwing the inserted bolts into the respective screw holes of the base plate 52.

The catch mechanism is configured in such a manner that when the door 25 is closed, a striker 53 provided in the corresponding side frame 19 is engageably inserted and a state of the striker 53 is switched from a canceling state in which the striker is released to a locking state in which the striker 53 is caught, and that the state of the striker 53 is switched from the locking state to the canceling state by an operation of a cancel mechanism 54 attached as accessory A to the cancel mechanism attaching portion 27M.

The cancel mechanism 54 includes: a fixed plate 55 having mounting holes (not shown) and weld nuts 55A corresponding to the respective mounting holes of the cancel mechanism attaching portion 27M; and a release lever 56 vertically swingably attached to a front end portion of the fixed plate 55, having an laterally extending operation part 56A on a free end of the release lever 56. The cancel mechanism 54 can be easily assembled to the cancel mechanism attaching portion 27M of the inner panel 27 in a state in which an upward operation of the operation part 56A can cause the switching of the catch mechanism from the locking state to the canceling state, by:

bringing the cancel mechanism 54 into the cavity 25B of the door main body 25A through the accessory access opening 28J; inserting the operation part 56A into the elongate hole 27Mb of the cancel mechanism attaching portion 27M; aligning the mounting holes and the weld nuts 55A of the fixed plate 55 with the respective mounting holes of the cancel mechanism attaching portion 27M; on the inner panel side of the door 25, inserting bolts 57 into the respective mounting holes of the cancel mechanism attaching portion 27M and the fixed plate 55; and screwing the inserted bolts 57 with the respective weld nuts 55A of the fixed plate 55.

An outer handle 58 as accessory A is formed in a U-shape whose both end portions have screw holes (not shown) corresponding to the mounting holes of the outer handle attaching portion 28D. The outer handle 58 can be easily assembled to the outer handle attaching portion 28D of the inner panel 27 in a state in which a pushing operation of a release button 58A provided in an upper portion of the outer handle 58 can cause the switching of the catch mechanism from the locking state to the canceling state, by: bringing the outer handle 58 into the cavity 25B of the door main body 25A through the accessory access opening 28J; aligning the screw holes with the respective mounting holes of the outer handle attaching portion 28D; inserting bolts from the cavity 25B of the door main body 25A into the respective mounting holes of the outer handle attaching portion 28D; and screwing the bolts with the respective screw holes of the outer handle 58.

Figure 9:
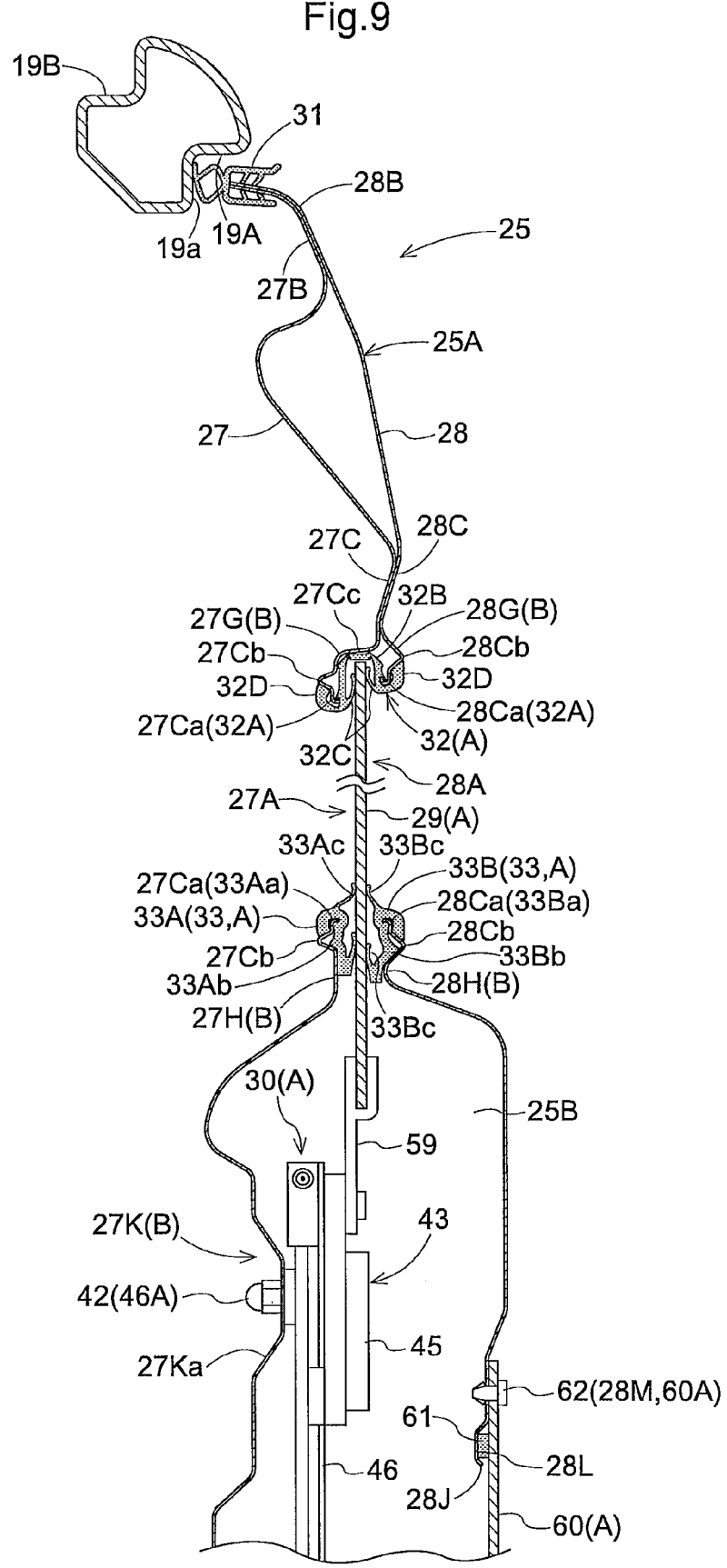

Referring to FIGS. 9-11, the glass run 32 includes, along an entire length thereof: two rows of engagement grooves 32A engageable with the respective glass run engaging portions 27Ca,28Ca provided in the glass run attaching portion 27G, 28G of the panels 27,28, respectively, and with a pair of the glass run engaging portions 41A provided in the front and rear window rails 41; a guide groove 32B into which end edge portion of the window panel 29 is engageably inserted and which is received by the glass run receiving portion 27Cc provided in the glass run attaching portion 27G of the inner panel 27 and by the glass run receiving portion 41B provided in the front and rear window rails 41; two rows of seal lips 32C extending from right and left ends of the opening of the guide groove 32B in such a manner that the seal lips 32C are brought into contact with each other by their elasticity; and the like. In addition, in right and left outer lips 32D forming outer walls of the respective engagement grooves 32A, cutouts 32Da are formed. Intermediate portions of the respective engagement grooves 32A are engaged with the respective engaging portion 27Ca,28Ca of the panels 27,28 so as to be attached along both the inner periphery 27C of the inner panel 27 and the inner periphery 28C of the outer panel 28. Then, both end portions of the glass run 32 are inserted between the inner periphery 27C of the inner panel 27 and the inner periphery 28C of the outer panel 28 into the cavity 25B of the door main body 25A, and both end portions of each of the engagement grooves 32A are engaged with the respective engaging portions 41A of the front and rear window rails 41 to thereby attach the glass run 32 to the front and rear window rails 41. With this configuration, while the slidable movement of the window panel 29 is allowed, water is prevented from entering a gap or the like between the inner periphery 27C of the inner panel 27 and the inner periphery 28C of the outer panel 28 of the door 25.

The weather strip 33 has a two-piece structure separated to the right and the left, including an inner strip 33A for inner panel and an outer strip 33B for outer panel.

Referring to FIGS. 9 and 11, the inner strip 33A includes, along an entire length thereof: an engagement groove 33Aa engageable with the engaging portion 27Ca for attaching weather strip provided in the weather strip attaching portion 27H of the inner panel 27; an engagement projection 33Ab engageably insertable into the engagement recess 27Cb for attaching weather strip; two rows of seal lips 33Ac extending from upper and lower end portions of the inner strip 33A toward the window panel 29; and the like. The engagement groove 33Aa is engaged with the engaging portion 27Ca for attaching weather strip, and the engagement projection 33Ab is engageably inserted into the engagement recess 27Cb for attaching weather strip, to thereby attach the inner strip 33A to the weather strip attaching portion 27H of the inner panel 27. With this configuration, while the slidable movement of the window panel 29 is allowed, water is prevented from entering a gap between the inner panel 27 and the window panel 29.

The outer strip 33B includes, along an entire length thereof: an engagement groove 33Ba engageable with the engaging portion 28Ca for attaching weather strip provided in the weather strip attaching portion 28H of the outer panel 28; an engagement projection 33Bb engageably insertable into the engagement recess 28Cb for attaching weather strip; and two rows of seal lips 33Bc extending from upper and lower end portions of the outer strip 33B toward the window panel 29; and the like. The engagement groove 33Ba is engaged with the engaging portion 28Ca for attaching weather strip, and the engagement projection 33Bb is engageably inserted into the engagement recess 28Cb for attaching weather strip, to thereby attach the outer strip 33B to the weather strip attaching portion 28H of the outer panel 28. With this configuration, while the slidable movement of the window panel 29 is allowed, water is prevented from entering a gap between the outer panel 28 and the window panel 29.

A lower end portion of the window panel 29 is provided with a pair of front and rear holders 59 made of resin for connecting the window panel 29 with the sliding body 45 of the window regulator 30. The window panel 29 can be easily assembled to the door 25 between the inner panel 27 and the outer panel 28 in a state in which the opening-closing movement is enabled, by: after assembling the window regulator 30 and the glass run 32 to the door main body 25A and before assembling the weather strip 33 and the front and rear window rails 41, inserting the window panel 29 into the cavity 25B of the door main body 25A from the window opening 28A of the outer panel 28 positioned outside of the door main body 25A having the outward curved (or bulging) shape described above through a gap between the inner periphery 27C of the inner panel 27 and the inner periphery 28C of the outer panel 28; receiving an end portion of the window panel 29 on an insertion side with a hand put into the cavity 25B of the door main body 25A from the accessory access opening 28J; engageably inserting front and rear end edge portions of the window panel 29 into the guide grooves 32B of the glass run 32; and connecting the front and rear holders 59 to the sliding body 45 of the window regulator 30 with bolts.

The decorative cover 60 as accessory A for closing the accessory access opening 28J is formed of a flat plate made of resin, and an outer periphery thereof has: a seal 61 made of sponge in a shape of a closed loop to be engageably inserted into the seal groove 28L of the outer panel 28; and a plurality of mounting holes 60A corresponding to the mounting holes 28M for decorative cover. The decorative cover 60 can be easily assembled to the door 25 in a state in which water is prevented from entering a gap between the decorative cover 60 and the outer panel 28, by: aligning the mounting holes 60A with the respective mounting holes 28M in the outer panel 28; and on the outer panel side of the door 25, inserting push rivets 62 made of resin into the respective mounting holes 28M.

Other Embodiments

[1] The door 25 may be those configured to be opened and closed with a rear end portion thereof as fulcrum, or may be those configured to be opened and closed in a sliding manner. Alternatively, the window openings 27A, 28A may be provided with the window panel 29 fixed thereto, or may not have the window panel 29.

[2] A kind of the accessory A to be assembled to the door main body 25A may vary depending on a specification of the door 25.

[3] A number, shape, position or the like of the accessory attaching portion B to be formed in the inner panel 27 may vary depending on a number, kind or the like of the accessory A to be assembled to the inner panel 27.

[4] The outer panel 28 may have the accessory access opening 28J which is configured to allow the window panel 29 to be brought into the door cavity 25B through the opening 28I

[5] A number, shape, position or the like of the accessory attaching portion B to be formed in the outer panel 28 may vary depending on a number, kind or the like of the accessory A to be assembled to the outer panel 28.

[6] The decorative cover 60 may be formed of sheet metal.

The door of the cabin for work vehicle according to the present invention is applicable to: an agricultural work vehicle, such as a tractor or combine having a cabin; a construction work vehicle, such as a backhoe; a multipurpose work vehicle for transportation; or the like.

What is claimed is:

1. A door attached to a cabin for work vehicle comprising:
   an outer panel which forms at least a portion of an exterior surface of the door and has an accessory access opening being formed only in the outer panel;
   an inner panel welded to the outer panel to form a unified structure, with a door cavity formed between the outer panel and the inner panel;
   an accessory attaching portion for a door accessory formed on a side of the inner panel facing the outer panel, wherein access and assembly of the door accessory to the accessory attaching portion are performed through the accessory access opening; and
   a decorative cover for closing the accessory access opening, wherein the decorative cover is centrally located on the outer panel and is removably attached to the outer panel through an outer surface of the decorative cover.

2. The door according to claim 1, wherein
   each of the inner panel and the outer panel has an inner periphery edge defining a window opening,
   a window panel for opening and closing the window opening and a window regulator for an opening-closing operation of the window panel are provided as accessories, and
   a gap is formed between the inner periphery edge of the inner panel and the inner periphery edge of the outer panel, the gap allowing insertion of the window panel from the window opening into the door cavity.

3. The door according to claim 1, wherein the accessory attaching portion is formed of a recess of the inner panel.

4. The door according to claim 1, wherein a lower end portion of the outer panel has a drainage hole for discharging water from the door cavity.

5. The door according to claim 1, wherein
   a hinge attaching portion as the accessory attaching portion is formed of the recess of the inner panel, and
   a door connecting hinge as the accessory is connected to the inner panel with a bolt with the outer panel being sandwiched between the door connecting hinge and the recess of the inner panel.

6. The door according to claim 1, wherein an outer handle attaching portion for attaching an outer handle is formed of a recess of the outer panel.

7. The door according to claim 1, wherein the door forms a substantially entire side face of the cabin.

8. The door according to claim 2, wherein
   the accessory access opening and the window opening have substantially the same width,
   the window opening occupies an upper half of the door, and
   the accessory access opening is provided in a lower half of the door.

9. The door according to claim 1, wherein the accessory attaching portion is formed of a projection of the inner panel.

10. The door according to claim 1,
    wherein the door cavity is in the form of a torus, and
    wherein the door cavity is closed by a first region where an outer periphery of the inner panel is facing an outer periphery of the outer panel, and a second region where an inner periphery of the inner panel forming the accessory access opening is facing an inner periphery of the outer panel forming the accessory access opening.

11. The door according to claim 1, wherein at least a portion of the door accessory is present in a region of the door cavity facing the accessory access opening.

12. A door attached to a cabin for a work vehicle comprising:
    an outer panel which forms at least a portion of an exterior surface of the door and has an accessory access opening;
    an inner panel welded to the outer panel to form a unified structure, with a door cavity formed between the outer panel and the inner panel;
    an accessory attaching portion for a door accessory formed in the inner panel, wherein access and assembly of the door accessory to the accessory attaching portion are performed through the accessory access opening; and
    a decorative cover for closing the accessory access opening, wherein the decorative cover is centrally located on the outer panel and is removably attached to the outer panel through an outer surface of the decorative cover,
    wherein at least a portion of the door accessory is present in a region of the door cavity facing the accessory access opening.

* * * * *